No. 828,607. PATENTED AUG. 14, 1906.
J. D. & C. D. KAYLOR.
ELEVATOR FOR SHREDDING MACHINES.
APPLICATION FILED MAR. 25, 1905.
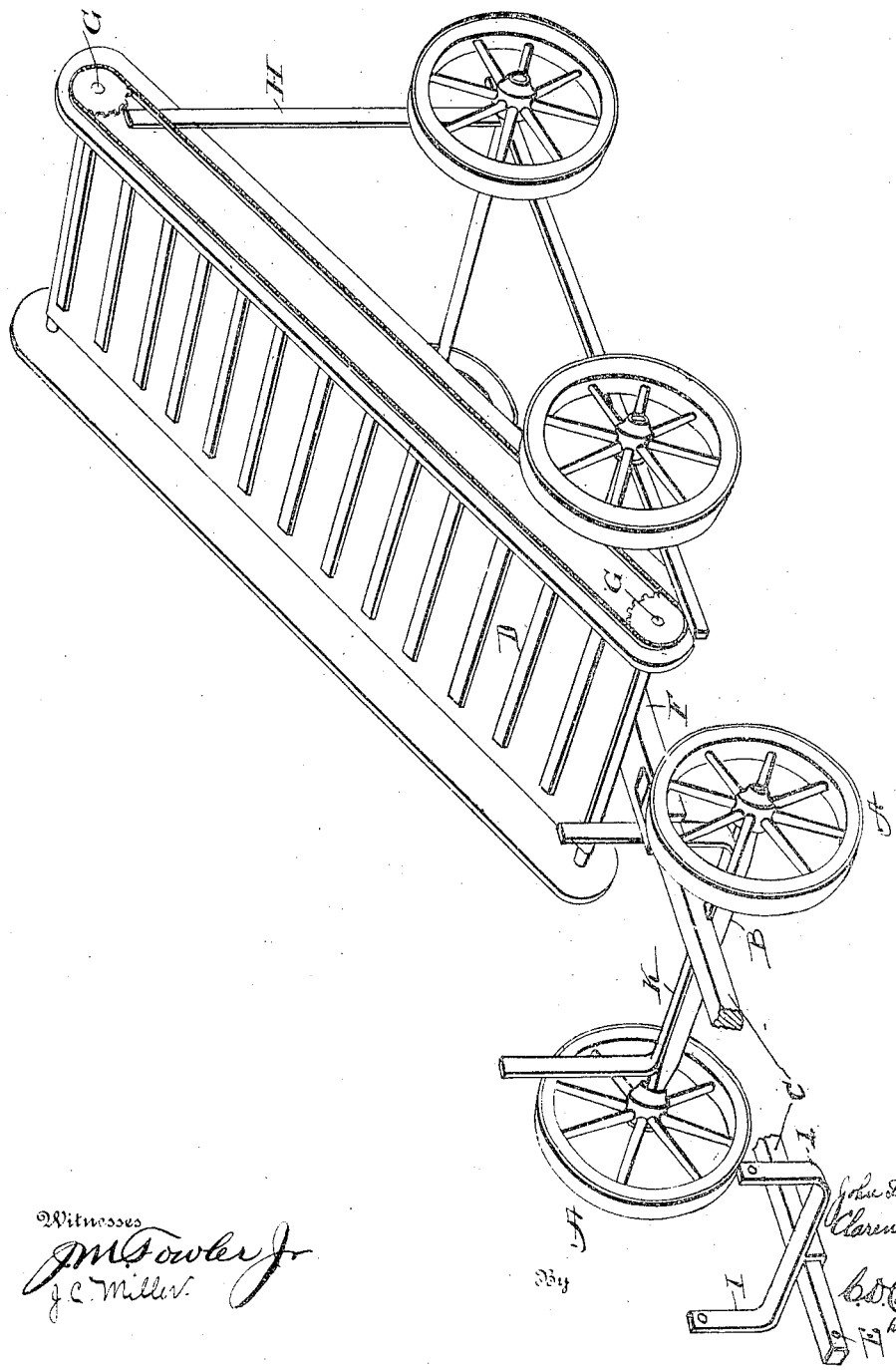

UNITED STATES PATENT OFFICE.

JOHN D. KAYLOR AND CLARENCE D. KAYLOR, OF HARRISON TOWNSHIP, LOGAN COUNTY, OHIO.

ELEVATOR FOR SHREDDING-MACHINES.

No. 828,607. Specification of Letters Patent. Patented Aug. 14, 1906.

Application filed March 25, 1905. Serial No. 252,417.

*To all whom it may concern:*

Be it known that we, JOHN D. KAYLOR and CLARENCE D. KAYLOR, citizens of the United States, residing in Harrison township, in the county of Logan and State of Ohio, have invented a new and useful Improvement in Elevators for Shredding Machines, of which the following is a specification.

Our invention relates to certain improvements in loading, hauling, and delivering shock-corn to a shredder and husker.

The figure is a perspective view of our device, in which—

A represents the wheels of our loader; B, the axle; C, lever for prying the shock loose from the ground and which also serves as a tongue; D, elevating-belt; E, hole through tongue by which other loaders are coupled to it; F, coupling of loader and elevator; G G, elevating-shafts; H, elevating-frame; I K, guards for holding fodder on the carrier.

Our loading device is operated by backing it up to a shock of fodder, standing lever C upright, securely fastening the shock to it, and then hitching a horse to the upper end of the pivoted lever and pulling it down to a horizontal position, bringing the shock secured to it off the ground loaded ready to take to the machine.

The feeding-table to all huskers and shredders is some five or six feet from the ground, so that the fodder can be fed to them from off the usual hay-ladders. To feed from the top of a load on hay-ladders is inconvenient, tedious, and unsatisfactory, the stalks becoming tangled, and many drop to the ground. With our device separate shocks are brought in on our individual carriers, which are backed up to the bottom of the unloader or elevator, and a man or boy on the ground feeds the stalks onto the elevating-belt, whence they are carried to the feed-rolls of the shredder in good order.

Feeding from the top of hay-ladders is very arduous, tiresome, and unsatisfactory work, and when a wagon drives away from the machine after unloading the driver has to dismount and gather up a great lot of tangled stalks that have fallen to the ground and throw them up to the feed-table. One of our carriers can be unloaded onto our unloading and delivering device in less time than the tangled stalks are now picked up.

We claim—

The pivoted lever C, mounted on wheels, the inclined unloader, and the projection or arm for coupling the same together.

JOHN D. KAYLOR.
CLARENCE D. KAYLOR.

Witnesses:
C. D. CAMPBELL,
EDWARD K. CAMPBELL.